Patented June 25, 1935

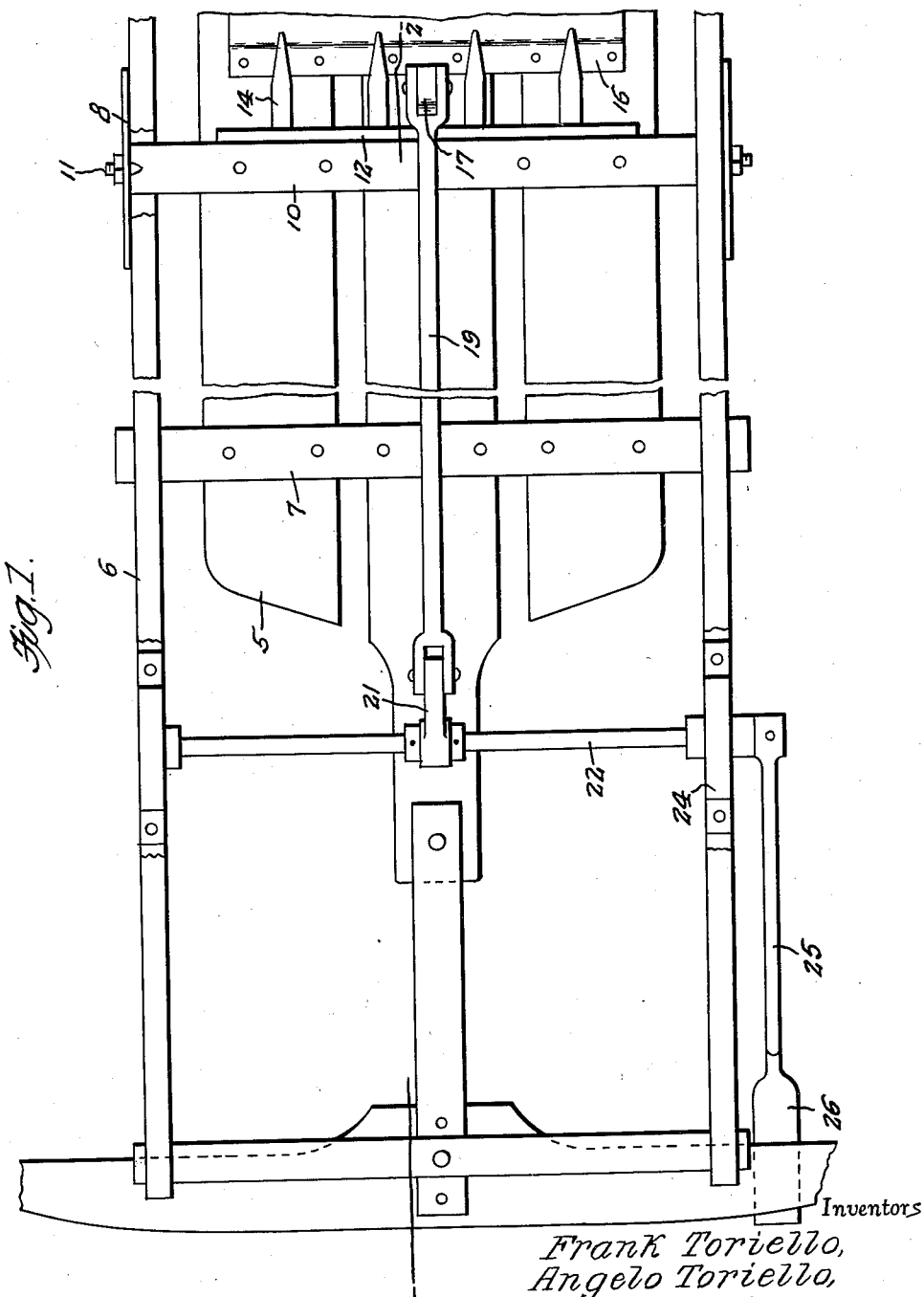

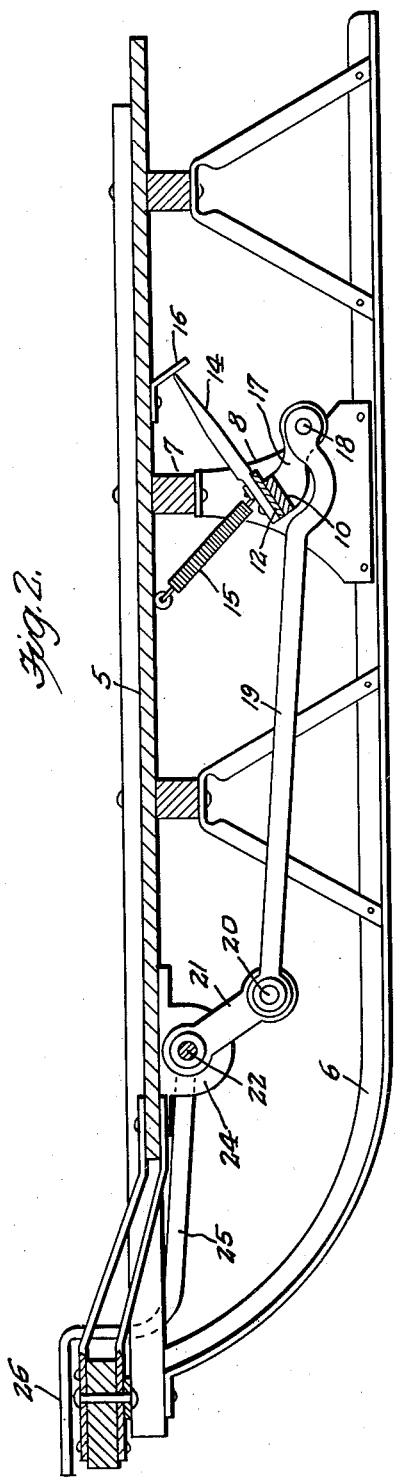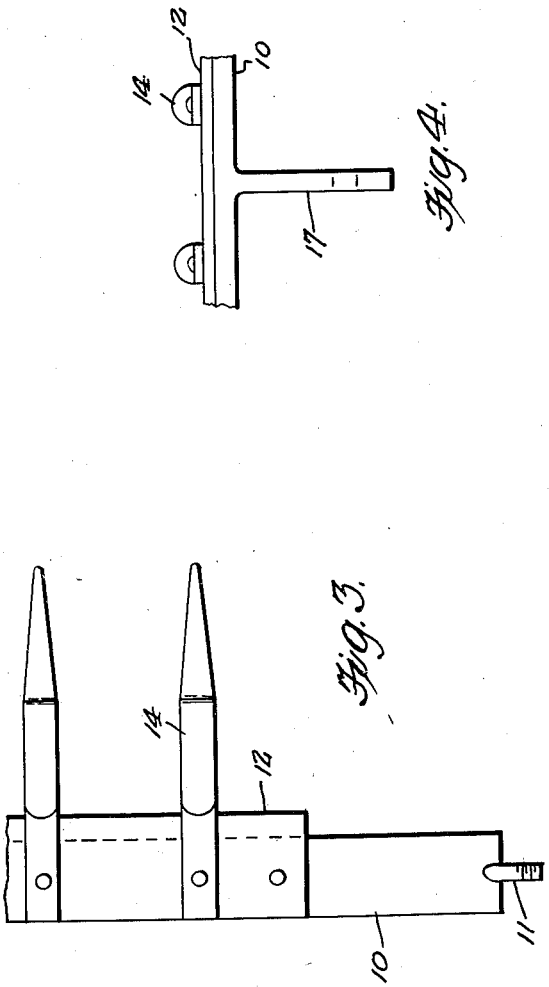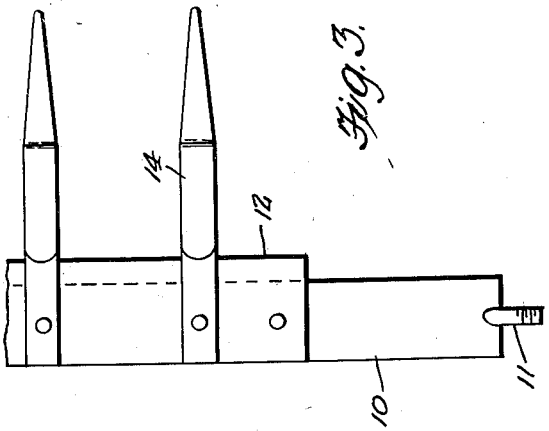

2,005,920

UNITED STATES PATENT OFFICE 2,005,920

SLED BRAKE

Frank Toriello and Angelo Toriello, Hackensack, and Adolph G. Schroeder, Teaneck, N. J.

Application June 1, 1934, Serial No. 728,590

1 Claim. (Cl. 188—8)

The present invention relates to a brake for a sled and has for its prime object to provide means whereby the movement of a sled may be effectively and efficiently decelerated and stopped in a safe manner.

Another very important object of the invention resides in the provision of a brake mechanism of this nature which is simple in its construction, inexpensive to construct and install, thoroughly reliable in operation, and otherwise well adapted to the purpose for which it is designed.

With the above and numerous other objects in view as will appear as the description proceeds, the invention consists in certain novel features of construction, and in the combination and arrangement of parts as will hereinafter be more fully described and claimed.

In the drawings:

Figure 1 is a fragmentary bottom plan view of a sled showing our mechanism incorporated therein.

Figure 2 is a longitudinal vertical section taken substantially on the line 2—2 of Figure 1.

Figure 3 is a fragmentary plan view of the engaging apparatus of the brake.

Figure 4 is an edge view thereof.

Referring to the drawings in detail it will be seen that we have illustrated a conventional sled including a top structure 5, runners 6, cross members 7, and brackets 8 all of which are quite conventional.

A bar 10 has trunnions 11 at the ends thereof rockable in the brackets 8. On the bar 10 is a plate 12 from which projects a plurality of spikes 14. A spring 15 engages the plate and is attached to the top 5 so as to normally hold the spikes in an upwardly and rearwardly inclined position shown in Figure 2 and the ends of the spikes have a guard 16 fixed to the top 15 and extending over the pointed ends thereof. A crank 17 is fixed to the bar 10 and is pivotally engaged as at 18 with a link rod 19. This link rod 19 is pivotally engaged as at 20 with the crank 21 fixed on a shaft 22 journalled in bearings 24 depending from the frame of the sled. A lever 25 is fixed to the crank 22 and has an offset extension 26 to extend over the foot guide mechanism of the sled. It will be seen that this lever 25 may be conveniently swung up and rearwardly thereby pulling forwardly on the link rod 19 and thereby swinging the engaging apparatus of the brake so as to engage the ice or snow over which the sled is moving.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described our invention, what we claim as new is:

In a sled including a top structure, runners and brackets connecting the runners with the top structure, a transversely extending bar having its ends pivotally supported by a pair of the brackets, a plate connected with the intermediate part of the bar, a plurality of teeth carried by the plate and extending rearwardly therefrom, a spring connecting the plate with a part of the top structure for normally holding the parts in a position with the teeth extending upwardly and rearwardly, a crank extending from the bar, a crank shaft extending transversely under the forward part of the sled, a link connecting the crank of said shaft with the first mentioned crank, a handle connected with the crank shaft, and a downwardly and rearwardly sloping guard connected to an under part of the top structure and against which the rear ends of the teeth bear when the parts are in inoperative position.

FRANK TORIELLO.
ANGELO TORIELLO.
ADOLPH GEO. SCHROEDER.